M. HAWIE.
HOSE SUPPORTER.
APPLICATION FILED APR. 14, 1922.
1,426,635.
Patented Aug. 22, 1922.
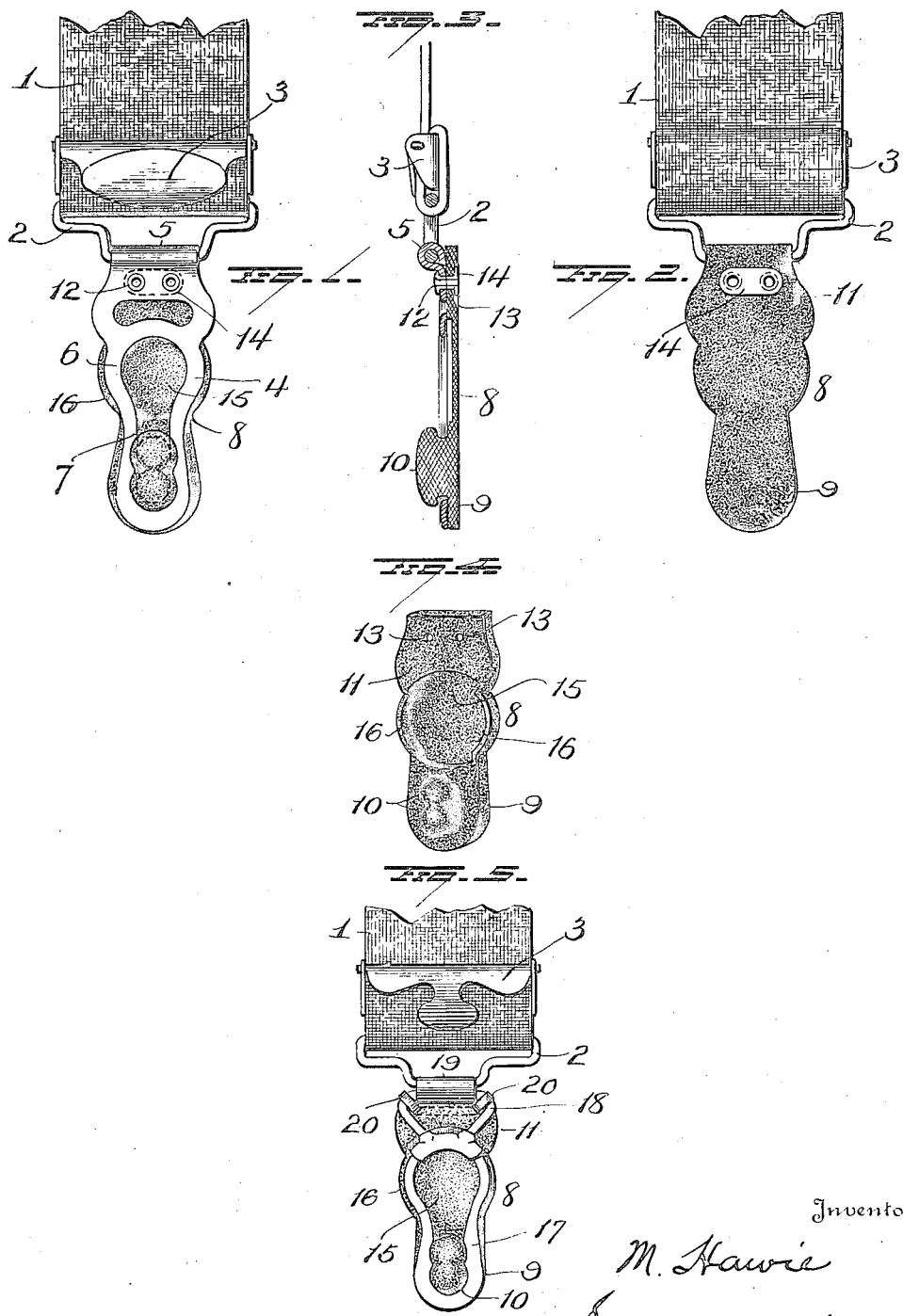

UNITED STATES PATENT OFFICE.

MICHAEL HAWIE, OF BRIDGEPORT, CONNECTICUT.

HOSE SUPPORTER.

1,426,635.   Specification of Letters Patent.   Patented Aug. 22, 1922.

Application filed April 14, 1922. Serial No. 552,693.

*To all whom it may concern:*

Be it known that I, MICHAEL HAWIE, a citizen of the United States, and a resident of Bridgeport, in the county of Fairfield and State of Connecticut, have invented certain new and useful Improvements in Hose Supporters; and I do hereby declare the following to be a full, clear, and exact description of the invention, such as will enable others skilled in the art to which it appertains to make and use the same.

This invention relates to improvements in hose supporters and more particularly to such as are especially adapted for use in connection with corsets, although my improvements are also adapted for use with hose supporters generally.

One object of my invention is to so construct a clasp for a hose supporter as to provide maximum tension and firmness of grip when applied to the hose and to afford necessary clinching and yet be yielding when in cooperation with the metal loop of the support.

A further object is to provide a simple and efficient soft rubber clasp for a garment supporter which shall be constructed in such manner that the stud or button and the base portions shall be made integral with each other; so that said stud or button portion shall be so formed as to insure maximum efficiency; so that the base or body portion shall be sufficiently flexible at its intermediate portion to permit ready bending and thus facilitate the application of the stud or button member to the metal loop during attachment of the supporter to the hose or to enable the ready removal of the stud or button from the metal loop to facilitate detachment of the supporter from the hose, and to so reinforce the flexible intermediate portion of the clasp as to permit the latter to effectually withstand strains to which it may be subjected.

With these and other objects in view, the invention consists in certain novel features of construction and combinations of parts as hereinafter set forth and pointed out in the claims.

In the accompanying drawings; Figure 1 is a front view showing an embodiment of my invention; Figure 2 is a rear view; Figure 3 is a sectional view; Figure 4 is a separate view of the clasp member, and Figure 5 is a view showing a modification.

In the drawings, I have shown at 1, a portion of the webbing of a hose supporter with which the hose attaching devices are connected through the medium of a wire loop 2, adjustment being effected with the use of a suitable buckle 3.

The hose attaching devices may include a sheet metal loop member 4, the upper end of which may be bent to form a sleeve 5 loosely embracing an intermediate portion of the wire loop, and the opening in said loop member 4 is formed to provide a wide upper portion 6 and a lower comparative narrow portion 7,—the latter being adapted to cooperate with the stud or button of the clasp member 8 of the device.

The clasp member 8 is made of soft rubber having a lower base portion 9 from which two rubber headed studs or buttons 10 project for cooperation with the metal loop member 4, said studs or buttons being of soft rubber and formed integral with said base 9 and also integral with each other. The clasp member is also formed with an upper base portion 11 which lies against the back of the upper portion of the sheet metal loop member 4 and may be secured thereto by means of rivets or eyelets 12, the latter passing through holes 13 in the upper base portion 11 of the rubber clasp 8 and through holes in the loop member 4 and made integral with a cross piece 14 disposed against the back of the rubber clasp member. The intermediate portion 15 of the rubber clasp member is recessed so that this intermediate portion will be sufficiently thin to permit its ready bending for facilitating the application of the supporter to or for removing it from the hose. The reduced intermediate portion 15 of the rubber clasp is curved at its side edges and formed with curved ribs 16, whereby said reduced portion will be so reinforced as to effectually withstand any strain to which it may be subjected.

Instead of making loop member 4 of sheet metal, I may employ a loop member 17 of wire as shown in Figure 5. A yoke portion 18 may be secured to and in effect form a part of the loop 17 and connected, through the medium of a sleeve 19 with the wire loop 2. With this construction, the upper base portion 11 of the rubber clasp member 8, may be secured to the yoke portion 18 of the loop member by means of a small strip or wire 20, the ends of which are passed through the rubber of the portion 11 of the clasp and made to embrace parts of said yoke portion 18.

The double rubber stud or button 10 of the rubber clasp member 8 is capable of adequately withstanding tension and insures a firm grip. The base 9 of the clasp member is of sufficient thickness to provide the necessary clinching and yielding when the studs or buttons are in cooperation with the metal loop member 4 or 17, and with the double head construction of stud or button, the same will not become accidentally released from the loop member.

My improvements are simple and substantial in construction, and provide an attaching portion for hose supporters, which is efficient and sure in operation and convenient to manipulate.

Having fully described my invention what I claim as new and desire to secure by Letters-Patent, is:—

1. In a hose supporter, the combination of a loop member and a soft rubber clasp member secured directly thereto, said clasp member provided near its free end with two headed rubber studs integral therewith and integral with each other, the intermediate portion of said soft rubber clasp having reduced thickness and having integral reinforcing edge portions adjacent thereto.

2. In a hose supporter, the combination of a rigid metal loop member, a soft rubber clasp member provided near one end with a double headed rubber stud portion integral therewith, fastening means passing through the upper portion of said soft rubber clasp member and directly engaging a part of said rigid metal loop member, an intermediate portion of said rubber clasp being thinner and more flexible than the end portions.

In testimony whereof, I have signed this specification.

MICHAEL HAWIE.